US012320267B2

(12) United States Patent
Lula et al.

(10) Patent No.: US 12,320,267 B2
(45) Date of Patent: Jun. 3, 2025

(54) FABRIC FOREIGN MATERIAL EXCLUSION SYSTEM

(71) Applicant: GE Infrastructure Technology LLC, Greenville, SC (US)

(72) Inventors: Magdalena Angelika Lula, Warsaw (PL); Thomas Alan Mogle, II, Greenville, SC (US); Christopher David Runkel, Greenville, SC (US); Sandra Beverly Kolvick, Greenville, SC (US); Nicholas Desmond Dupre, Greenville, SC (US); Kelly Anne McManus, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/643,156

(22) Filed: Apr. 23, 2024

(65) Prior Publication Data

US 2024/0360773 A1 Oct. 31, 2024

(30) Foreign Application Priority Data

Apr. 28, 2023 (PL) ........................................ 444688

(51) Int. Cl.
*F01D 25/24* (2006.01)

(52) U.S. Cl.
CPC .......... *F01D 25/24* (2013.01); *F05D 2230/60* (2013.01); *F05D 2300/601* (2013.01)

(58) Field of Classification Search
CPC ........... F02C 7/00–36; Y10T 29/49318; Y10T 29/4932; Y10T 29/49321; F04D 29/70; F04D 29/701; F01D 25/24; F01D 25/28; F01D 25/285; F05D 2260/607; F05D 2230/60–90; B64F 5/30; B64F 5/40
See application file for complete search history.

(56) References Cited

U.S. PATENT DOCUMENTS

| | | | | |
|---|---|---|---|---|
| 5,809,770 | A * | 9/1998 | Jahn | F01N 1/082 415/119 |
| 6,109,843 | A | 8/2000 | Descoteaux | |
| 2010/0095984 | A1 | 4/2010 | Tadayon | |
| 2011/0073745 | A1 * | 3/2011 | Duchatelle | F01D 9/04 248/637 |
| 2019/0249601 | A1 * | 8/2019 | Wunsch | B01D 39/12 |
| 2020/0056541 | A1 * | 2/2020 | Cooper | F01D 25/285 |

FOREIGN PATENT DOCUMENTS

| | | |
|---|---|---|
| EP | 2 998 061 B1 | 7/2019 |

OTHER PUBLICATIONS

Extended Search Report, EP 24169998.2, dated Aug. 27, 2024 (9 pp.).

* cited by examiner

*Primary Examiner* — Loren C Edwards
(74) *Attorney, Agent, or Firm* — Eversheds Sutherland (US) LLP

(57) ABSTRACT

A foreign material exclusion system for positioning within a casing of a turbine to catch any foreign material during maintenance of the turbine. The foreign material exclusion system may include a fabric sleeve with a semicircular shape and a number of poles attached to the sleeve to maintain the sleeve in place within the turbine casing.

15 Claims, 4 Drawing Sheets

FABRIC FOREIGN MATERIAL EXCLUSION SYSTEM

CROSS-REFERENCE TO RELATED APPLICATIONS

This application claims priority pursuant to 35 U.S.C. 119(a) to Polish Application No. P.444688, filed Apr. 28, 2023, which application is incorporated herein by reference in its entirety.

TECHNICAL FIELD

The present application and the resultant patent relate generally to turbomachinery such as gas turbines and steam turbines and more particularly relate to a fabric foreign material exclusion system to capture foreign material such as turbine pins and other objects that may become lost during removal and replacement of turbine blades or other types of procedures.

BACKGROUND

A gas turbine engine conventionally includes a compressor for compressing ambient air and a combustor for mixing the flow of air with a flow of fuel to generate hot combustion gases. A turbine receives the flow of hot combustion gases and extracts energy therefrom for powering the compressor and for producing output power for an external load such as an electrical generator and the like. Turbine components such as turbine buckets and blades positioned along the hot gas path are subject to not only high combustion temperatures but also different types of dynamic forces. Given such, these hot gas path components may be replaced and/or refurbished on a periodic basis to ensure efficient performance.

Turbine blades may have a number of relatively small components such as seal pins and damper pins attached thereto. These relatively small components must be removed with the turbine blades. If a pin or other type of component were to be misplaced and left inside the turbine, the component could cause catastrophic damage upon the restart of the turbine.

Current foreign material exclusion systems may use a large tarp that is positioned under the rotating turbine components to catch foreign material such as the pins and the like. The tarp may be secured by taping the tarp to the casing. The tarp, however, tends to bunch up under the rotating components and may be snagged and/or may slip under the rotating components. Such snagging or slipping may allow a pin or other type of foreign material to escape into the turbine, particularly when removing the tarp. Given such, foreign material remains a significant issue during turbine maintenance and other procedures.

SUMMARY

The present application and the resultant patent thus provide a foreign material exclusion system for positioning within a casing of a turbine to catch any foreign material during maintenance of the turbine. The foreign material exclusion system may include a fabric sleeve with a semi-circular shape and a number of poles attached to the sleeve to maintain the sleeve in place within the turbine casing.

The present application and the resultant patent further provide a method of inserting a foreign material exclusion system into a casing of a turbine about a number of stages thereof. The method may include the steps of sliding a sleeve between the casing and the number of stages, inserting one or more poles into the sleeve, attaching the sleeve to the casing with one or more sled hooks, and attaching one or more horizontal joint frame plates to the sleeve.

The present application and the resultant patent further provide a foreign material exclusion system for positioning within a casing of a turbine to catch any foreign material during maintenance of the turbine. The foreign material exclusion system may include a fabric sleeve with a semi-circular shape, a number of channels formed therein, and a horizontal joint frame plate. A number of poles may be positioned within the channels to maintain the sleeve in place within the turbine casing.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
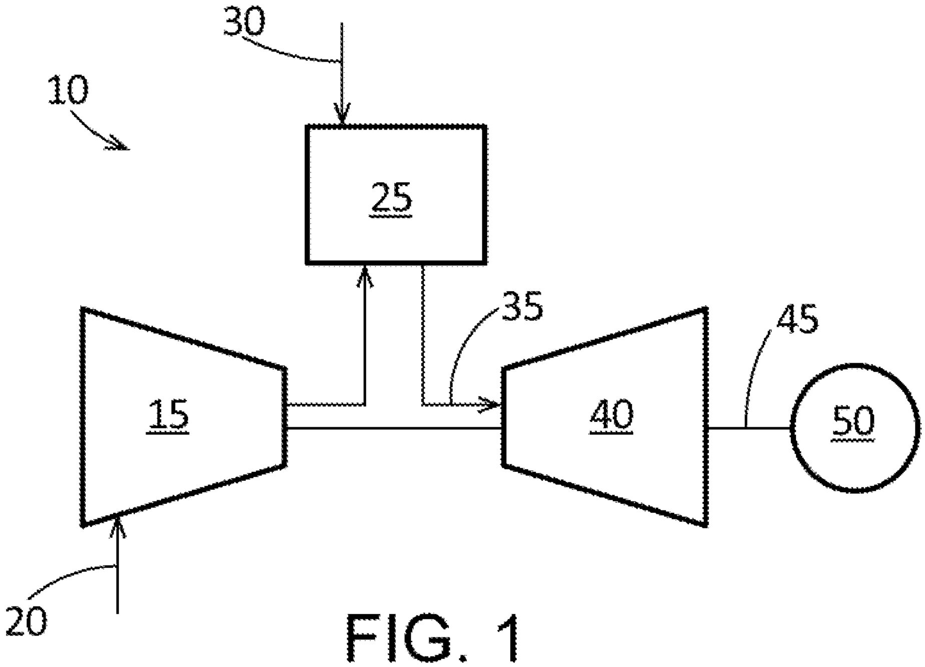
FIG. 1 is a schematic diagram of a gas turbine engine including a compressor, a combustor, a turbine, and an external load.

Referring now to the drawings, in which like numerals refer to like elements throughout the several views, FIG. 1 shows a schematic diagram of a gas turbine engine 10 as may be used herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. Alternatively, the combustor 25 may be an annular combustor. The flow of combustion gases 35 is in turn delivered to a turbine 40. The flow of combustion gases 35 drives the turbine 40 to produce mechanical work. The mechanical work produced in the turbine 40 drives the compressor 15 via a rotor shaft 45 and an external load 50 such as an electrical generator and the like.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, New York, including, but not limited to, those such as a 7-series or a 9-series heavy duty gas turbine engine and the like. The gas turbine engine 10 may be part of a simple cycle or a combined cycle power generation system or other types of generation systems. The gas turbine engine 10 may have different configurations and may use other types of components. Other types of gas turbine engines also may be used herein. Multiple gas turbine engines, other types of turbines, and other types of power generation equipment also may be used herein together.

Figure 2:
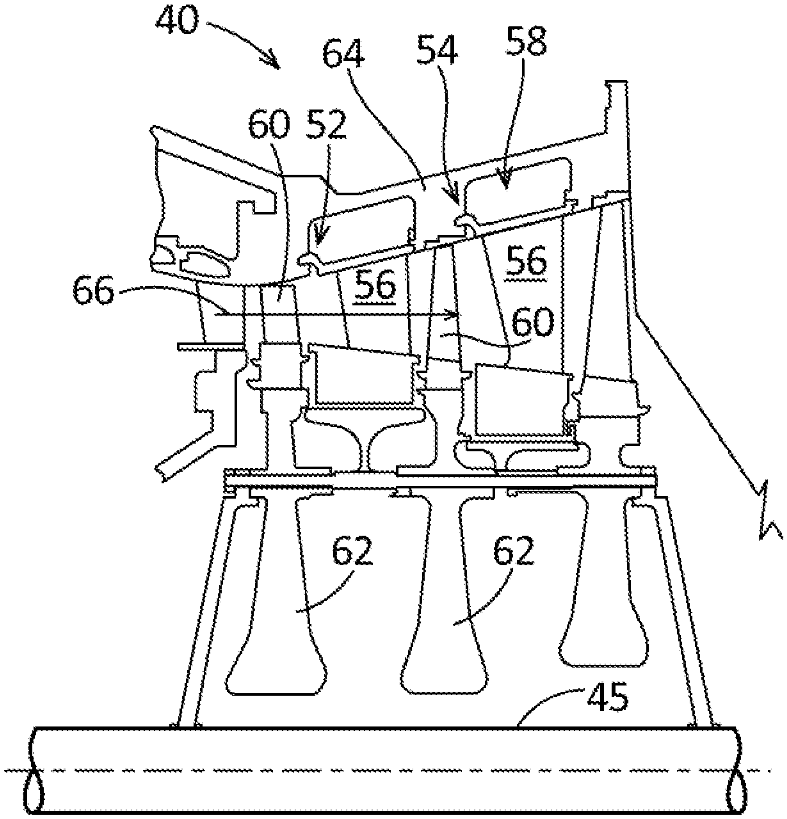
FIG. 2 is a schematic diagram of a number of stages positioned within a casing of a turbine.

FIG. 2 is a partial sectional view of the turbine 40. The turbine 40 includes a number of stages 52. Generally described, each stage 52 includes a stationary row 54 of stator vanes 56 and a rotating row 58 of turbine blades 60. In this example, three stages 52 are shown, a first stage, a second stage, and a third stage. The turbine blades 60 in each row 58 are spaced circumferentially about, and extend radially outward from, a rotor disk 62. Each rotor disk 62 is coupled to the rotor shaft 45. A turbine casing 64 extends circumferentially about the stator vanes 56. The stator vanes 56 are each coupled to the turbine casing 64 and each stator vane 56 extends radially inward from the casing 64 towards the rotor shaft 45. A hot combustion gas path 66 is defined between the turbine casing 64 and each rotor disk 62.

Figure 3:
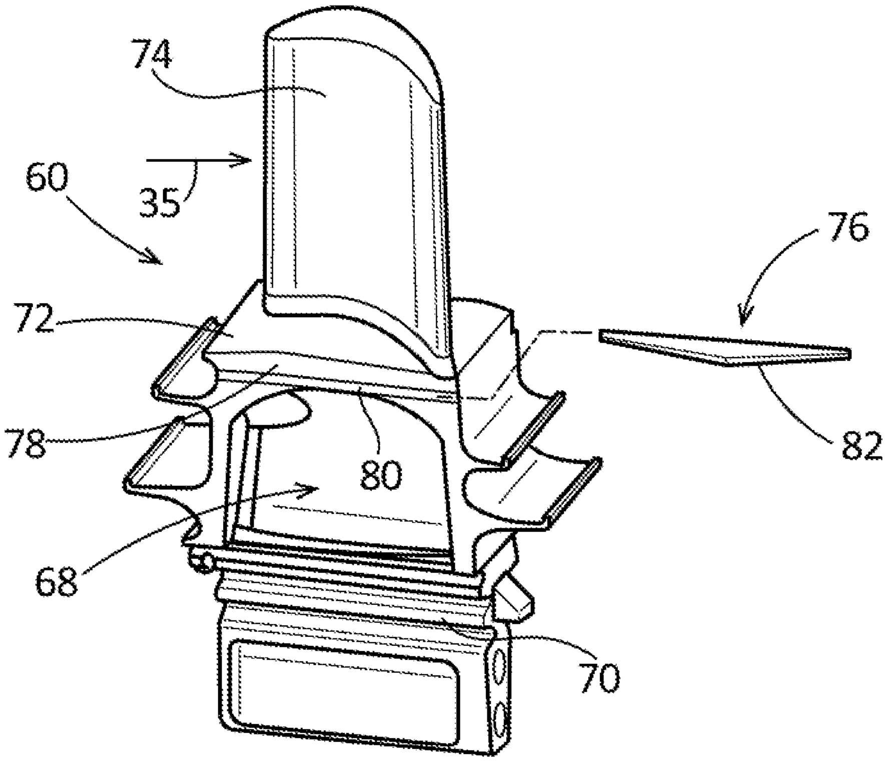
FIG. 3 is a perspective view of a turbine blade.

FIG. 3 shows an example of a turbine blade 60 of the turbine 40. The turbine blade 60 may include a shank 68, a dovetail 70, a platform 72, and an airfoil 74. The dovetail 70 secures the turbine blade 60 to a periphery of the rotor disk 62. The platform 72 defines an inward flow boundary for the combustion gases 35 flowing through the hot combustion gas path 66. A damper pin 76 may be located along one axial edge (or slash face) 78 adjacent to (i.e., radially inward of) the platform 72. Specifically, the damper pin 76 may be located in an elongated groove 80 that extends along the slash face 78 of the turbine blade 60. The damper pin 76 frictionally dissipates vibratory energy and reduces corresponding amplitude of vibration. A similar damper pin 76 may be located between each adjacent pair of turbine blades 60. Other types of pins such as seal pins and the like also may be used herein. During the deblading process and other types of maintenance, the pins 76 and the like may become a foreign material 82 capable of damage to the turbine 40 if not accounted for and removed.

Figure 4:
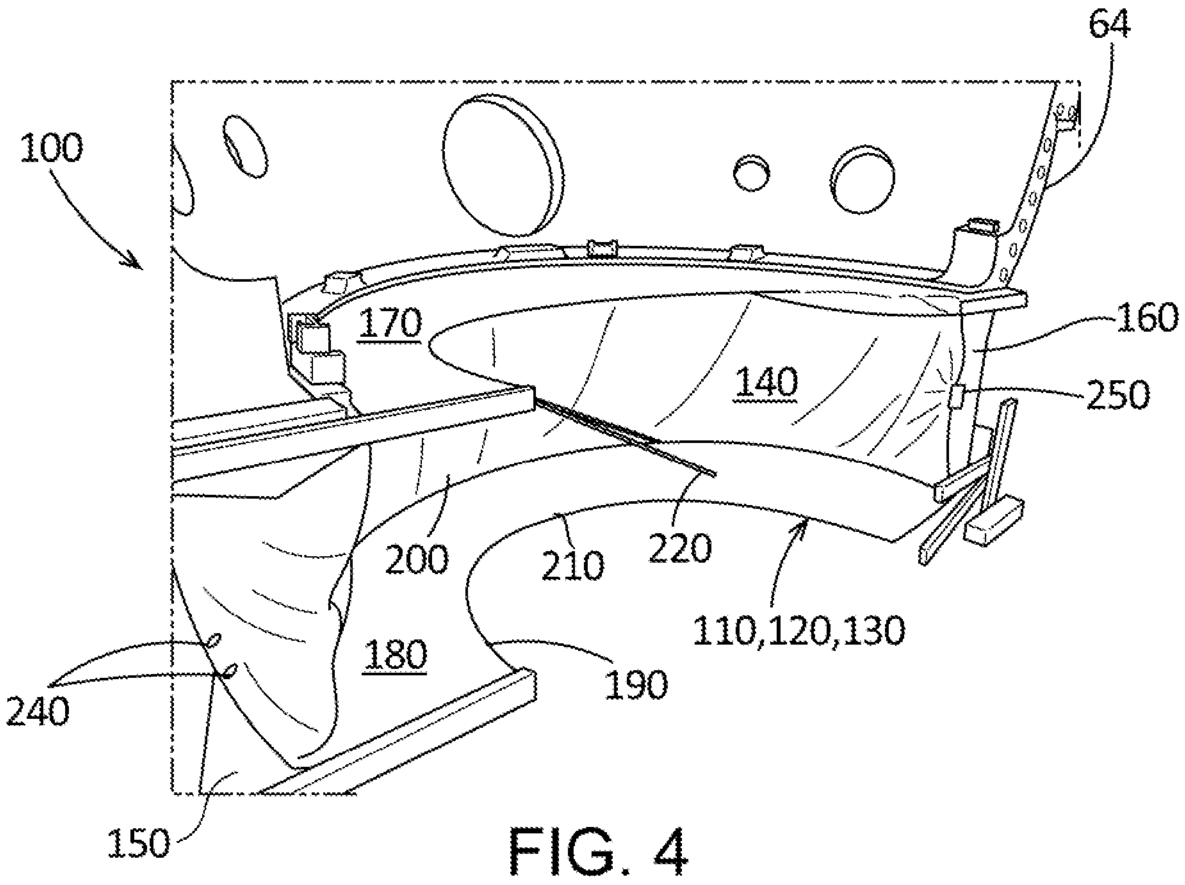
FIG. 4 is a perspective view of a foreign material exclusion system as may be described herein.
Figure 5:
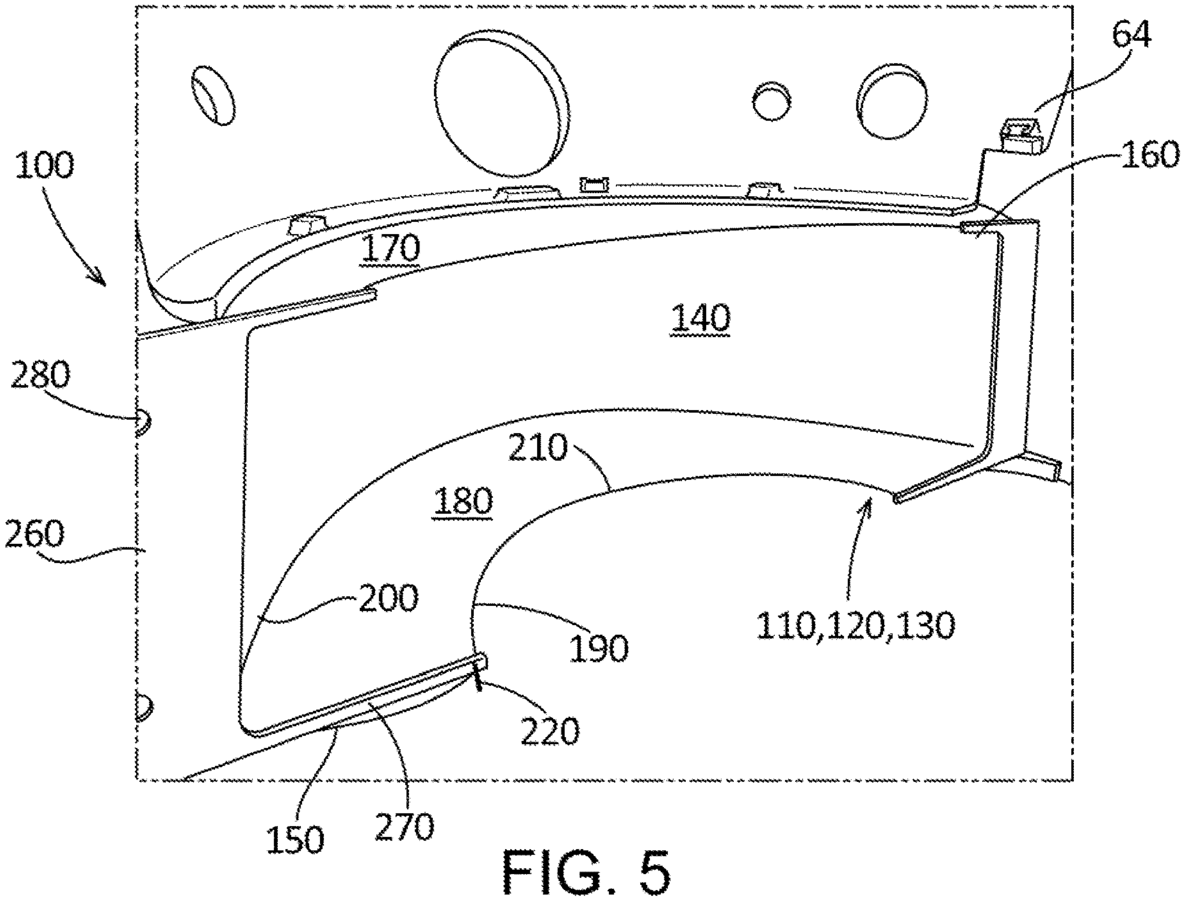
FIG. 5 is a further perspective view of the foreign material exclusion system of FIG. 4.
Figure 6:
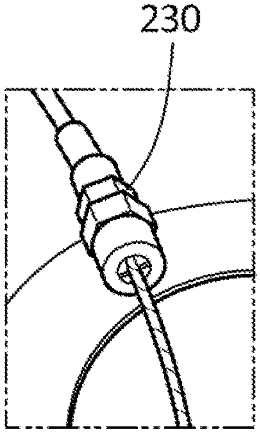
FIG. 6 is a perspective view of a rigid fiber collet for use with the foreign material exclusion system of FIG. 4.

FIGS. 4 and 5 show an example of a foreign material exclusion system 100 as may be described herein. The foreign material exclusion system 100 may include a sleeve 110. The sleeve 110 may have a substantial semicircular shape 120. Specifically, the sleeve 110 may be sized and shaped to fit within a lower half of the casing 64. The sleeve 110 may extend across several stages 52. The sleeve 110 may be made out of a fabric 130. The fabric 130 may include woven plastic mesh, nonwoven synthetic material, impregnated resins, natural porous fibers such as cotton, heavy duty waterproof and temperature resistant material, or any flexible, formable surface covering, and similar types of materials and blends thereof.

Figure 7:
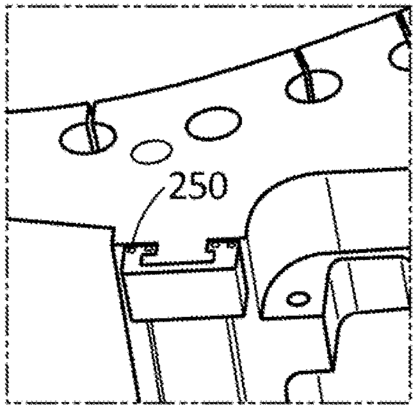
FIG. 7 is a perspective view of a sled hook for use with the foreign material exclusion system of FIG. 4.

Generally described, the sleeve 110 may include a base wall 140 extending from a first end 150 to a second end 160, a first sidewall 170, and a second sidewall 180. The base wall 140 and the sidewalls 170, 180 may be sown together to form the sleeve 110. Alternatively, zippers (clasp lockers) and the like also may be used to connect the walls. The sidewalls 170, 180 may have channels 190 formed in an inner edge 200 and an outer edge 210 thereof. The channels 190 may be sized for the elongated poles 220 to be positioned therein. The elongated poles 220 may be curved in the semicircular shape 120 and serve to provide rigidity to the sleeve 110. The elongated poles 220 may be made out of any substantially rigid material such as plastics, steel or metal such as aluminum and titanium, carbon fiber, fiberglass, combinations thereof, and the like. As is shown in FIG. 7 and as will be described in more detail below, the poles 220 of the sleeve 110 may be tensioned and held in place by a number of rigid fiber collets 230 and the like. Other types of tensioning devices may be used herein. Other components and other configurations may be used herein.

Figure 8:
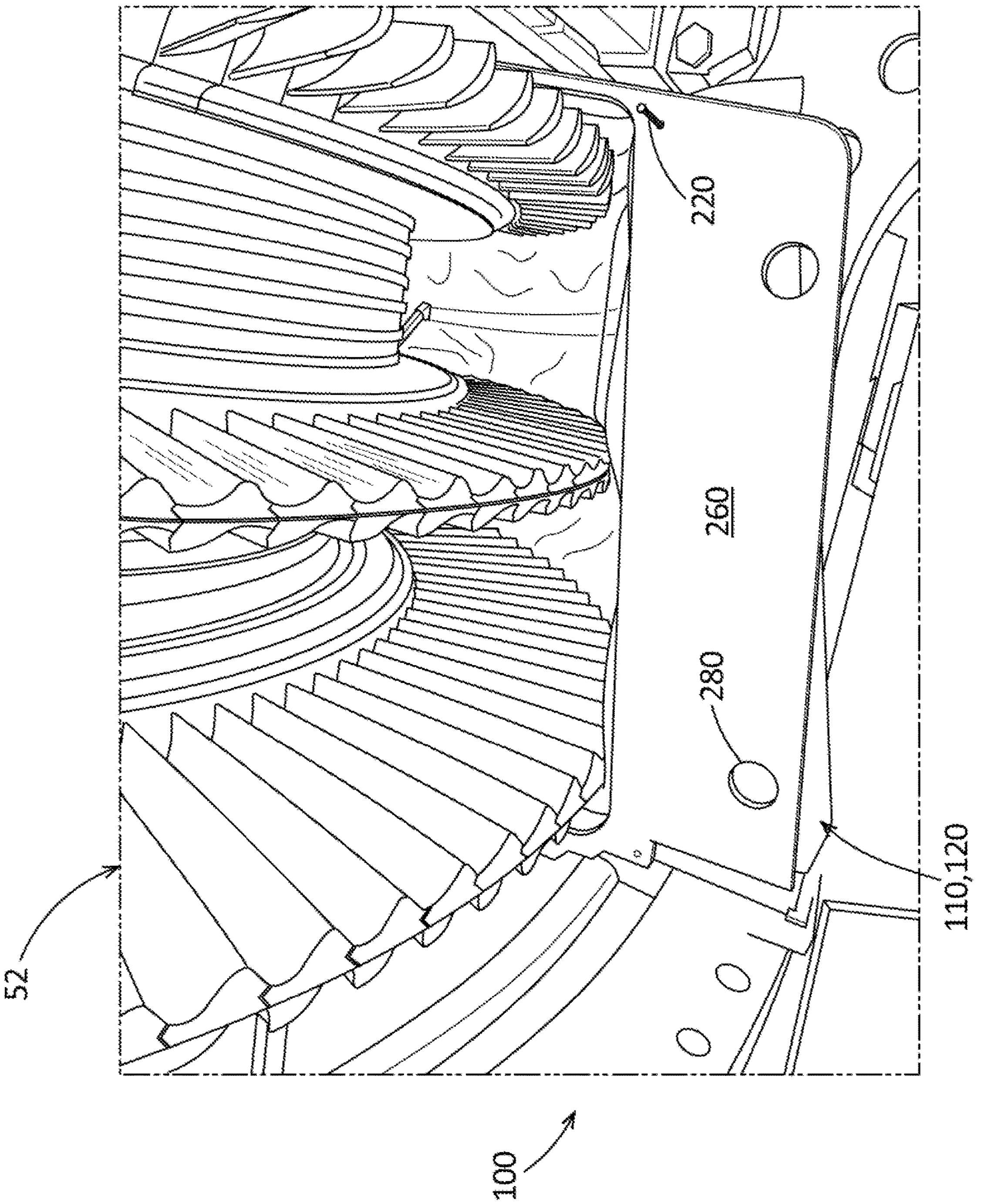
FIG. 8 is a perspective view of the foreign material exclusion system of FIG. 4 positioned within the casing of the turbine.

The first and second ends 150, 160 of the base wall 140 may have magnets 240 and the like sewn or otherwise positioned therein. The magnets 240 are attracted to the metal of the lower half of the casing 64 to keep the sleeve 110 in place. Alternatively, different types of weights and the like also may be used. The first and second ends 150, 160 of the base wall 140 also may be held in place by a number of sled hooks 250. As is shown in FIG. 8 and described in more detail below, the sled hooks 250 pin the fabric 130 into position within the casing 64 along the ends 150, 160 of the base wall 140. The sled hooks 250 may be sized to accommodate specific shroud hook geometry and the like of a predetermined stage. The sled hooks 250 may capture the sleeve 110 to the circumference of the casing 64 via the poles 220 and the like.

The first and second ends 150, 160 of the base wall 140 may be covered by a horizontal joint frame plate 260. The horizontal joint frame plate 260 may be sized and shaped to ensure that the horizontal joint of the casing 64 is enclosed. The horizontal joint frame plate 260 may include a pair of flanges 270 that extend on either side of the stages 52. The horizontal joint frame plate 260 also may include a number of pole apertures 280 for the elongated poles 220 to extend therethrough. The elongated poles 220 aid in maintaining the horizontal joint frame plate 260 in position. Other components and other configurations may be used herein.

In use as is shown in FIG. 8, the foreign material exclusion system 100 may be slid into place about the lower half of the casing 64 beneath rows 58 of the turbine blades 60. Specifically, the custom fit sleeve 110 may be positioned into place, the elongated poles 220 may be positioned within the channels 190, and the elongated poles 220 may be tensioned via the rigid fiber collets 230. The elongated poles 220 may provide the tight fit of the fabric 130 of the sleeve 110 to the casing 64. Given such, the tight fit avoids bunching of the fabric 130. The magnets 240 sewn in on both ends 150, 160 of the sleeve 110 hold the sleeve 110 in position and enable optimal folding of the fabric 130 when removing the sleeve 110 from the casing 64. This optimal folding ensures that any foreign material that fell into the sleeve 110 during the procedure is contained and safely removed. The horizontal joint frame plates 260 on the horizontal joints of the casing 64 keep the fabric 130 in place and close off all possible foreign material pathways about the ends thereof. Likewise, the sled hooks 250 ensure the proper guidance of the fabric 130 of the sleeve 110 into position.

The use of the fabric 130 for the sleeve 110 of the foreign material exclusion system 100 thus provides a custom fit that may be resistant of wear, tear, and heat. The custom fit thus provides maximum protection from foreign material entrance into the turbine area. The use of the elongated poles 220 in the semicircular shape 120 ensures that the sleeve 110 maintains the correct position with respect to the curvature of the casing 64. The foreign material exclusion system 100 thus reduces the opportunity for foreign object damage during hot gas path inspection, deblading, and other procedures.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. A foreign material exclusion system for positioning within a casing of a turbine to catch any foreign material during maintenance of the turbine, comprising a sleeve with a semicircular shape; the sleeve comprising a fabric; and a plurality of poles attached to the sleeve to maintain the sleeve in place within the turbine casing.
2. The foreign material exclusion system of any preceding clause, wherein the sleeve comprises a base wall, a first sidewall, and a second sidewall.
3. The foreign material exclusion system of any preceding clause, wherein the first sidewall and the second sidewall comprise a plurality of channels to accommodate the plurality of poles.
4. The foreign material exclusion system of any preceding clause, wherein the first sidewall and the second sidewall comprise an inner edge and an outer edge and wherein the inner edge and the outer edge both accommodate one of the plurality of channels therein.
5. The foreign material exclusion system of any preceding clause, wherein the base wall comprises a first end and a second end.
6. The foreign material exclusion system of any preceding clause, wherein the first end and the second end comprises a plurality of magnets therein.
7. The foreign material exclusion system of any preceding clause, wherein the first end and the second end comprise one or more sled hooks thereon.
8. The foreign material exclusion system of any preceding clause, wherein the one or more sled hooks are sized for a predetermined stage of the turbine.
9. The foreign material exclusion system of any preceding clause, wherein the first end and the second end comprise a horizontal joint frame plate thereon.
10. The foreign material exclusion system of any preceding clause, wherein the horizontal joint frame plate comprises a pair of flanges thereon.
11. The foreign material exclusion system of any preceding clause, wherein the horizontal joint frame plate comprises a plurality of pole apertures sized to accommodate the plurality of poles.
12. The foreign material exclusion system of any preceding clause, wherein the base wall, the first sidewall, and the second sidewall are sewn or zippered together.
13. The foreign material exclusion system of any preceding clause, wherein the plurality of poles each comprise a rigid fiber collet for tensioning.
14. The foreign material exclusion system of any preceding clause, wherein the fabric comprises natural or synthetic materials.
15. A method of inserting a foreign material exclusion system into a casing of a turbine about a number of stages thereof, comprising: sliding a sleeve between the casing and the number of stages; inserting one or more poles into the sleeve; attaching the sleeve to the casing with one or more sled hooks; and attaching one or more horizontal joint frame plates to the sleeve.
16. A foreign material exclusion system for positioning within a casing of a turbine to catch any foreign material during maintenance of the turbine, comprising: a sleeve with a semicircular shape; the sleeve comprising a fabric; the sleeve comprising a plurality of channels therein; a plurality of poles positioned within the plurality of channel to maintain the sleeve in place within the turbine casing; and a horizontal joint frame plate positioned about the sleeve.
17. The foreign material exclusion system of any preceding clause, wherein the sleeve comprises a plurality of magnets therein.
18. The foreign material exclusion system of any preceding clause, wherein the sleeve comprises one or more sled hooks thereon.
19. The foreign material exclusion system of any preceding clause, wherein the plurality of poles each comprise a rigid fiber collet for tensioning.
20. The foreign material exclusion system of any preceding clause, wherein the fabric comprises natural or synthetic materials.

The invention claimed is:

1. A foreign material exclusion system for positioning within a casing of a turbine to catch any foreign material during maintenance of the turbine, the turbine comprising a plurality of turbine blades, the system comprising:

a flexible sleeve with a semicircular shape fitted on the casing circumferentially between the casing and the plurality of turbine blades;

the flexible sleeve comprising a fabric; and a plurality of poles attached to the flexible sleeve under tension to maintain the flexible sleeve fitted in place on the casing.

2. The foreign material exclusion system of claim 1, wherein the flexible sleeve comprises a base wall, a first sidewall, and a second sidewall.

3. The foreign material exclusion system of claim 2, wherein the first sidewall and the second sidewall comprise a plurality of channels to accommodate the plurality of poles.

4. The foreign material exclusion system of claim 3, wherein the first sidewall and the second sidewall comprise an inner edge and an outer edge and wherein the inner edge and the outer edge both accommodate one of the plurality of channels therein.

5. The foreign material exclusion system of claim 2, wherein the base wall comprises a first end and a second end.

6. The foreign material exclusion system of claim 5, wherein the first end and the second end comprise a plurality of magnets therein.

7. The foreign material exclusion system of claim 5, wherein the first end and the second end comprise one or more sled hooks thereon.

8. The foreign material exclusion system of claim 7, wherein the one or more sled hooks are sized for a predetermined stage of the turbine.

9. The foreign material exclusion system of claim 5, wherein the first end and the second end comprise a horizontal joint frame plate thereon.

10. The foreign material exclusion system of claim 9, wherein the horizontal joint frame plate comprises a pair of flanges thereon.

11. The foreign material exclusion system of claim 9, wherein the horizontal joint frame plate comprises a plurality of pole apertures sized to accommodate the plurality of poles.

12. The foreign material exclusion system of claim 2, wherein the base wall, the first sidewall, and the second sidewall are sewn or zippered together.

13. The foreign material exclusion system of claim 1, wherein the plurality of poles each comprise a rigid fiber collet for tensioning.

14. The foreign material exclusion system of claim 1, wherein the fabric comprises natural or synthetic materials.

15. A method of inserting a foreign material exclusion system into a casing of a turbine about a number of stages thereof, each of the stages comprising a plurality of turbine blades, the method comprising:

sliding a flexible sleeve circumferentially between the casing and the plurality of turbine blades of the number of stages;

inserting one or more poles into the flexible sleeve under tension;

fitting the sleeve to the casing with one or more sled hooks; and attaching one or more horizontal joint frame plates to the sleeve.

* * * * *